United States Patent [19]

Schneider et al.

[11] Patent Number: 5,609,766
[45] Date of Patent: Mar. 11, 1997

[54] PROCESS FOR TREATING BROMIDE-CONTAINING WATER USING OZONE

[75] Inventors: Wilhelm Schneider, Heidenrod; Ralf Gerz, Mainz, both of Germany

[73] Assignee: Schmidding-Werke, Wilhelm Schmidding GmbH & Co., Cologne, Germany

[21] Appl. No.: 549,825

[22] PCT Filed: May 3, 1994

[86] PCT No.: PCT/DE94/00487

§ 371 Date: Apr. 17, 1996

§ 102(e) Date: Apr. 17, 1996

[87] PCT Pub. No.: WO94/26671

PCT Pub. Date: Nov. 24, 1994

[30] Foreign Application Priority Data

May 17, 1993 [DE] Germany .......................... 43 16 447.1
Jun. 11, 1993 [DE] Germany .......................... 43 19 321.8

[51] Int. Cl.⁶ .................. C02F 1/28; C02F 1/76; C02F 1/78

[52] U.S. Cl. .................. 210/662; 210/668; 210/669; 210/754; 210/760; 210/764

[58] Field of Search ....................... 210/754, 760, 210/764, 663, 668, 669, 662

[56] References Cited

U.S. PATENT DOCUMENTS

| | | | |
|---|---|---|---|
| 3,805,481 | 4/1974 | Armstrong | 210/760 |
| 4,136,027 | 1/1979 | Sakamoto et al. | 204/176 |
| 4,453,953 | 6/1984 | Tanaka et al. | 55/163 |
| 4,552,659 | 11/1985 | Tabata et al. | 210/177 |
| 5,264,136 | 11/1993 | Howarth et al. | 210/754 |

*Primary Examiner*—Cynthia L. Nessler
*Attorney, Agent, or Firm*—K. S. Cornaby

[57] ABSTRACT

In a water treatment process using ozone, to prevent bromate formation a quantity of bromide-containing water for treatment is first set to a pH value of less than 6.5 by feeding in $CO_2$, unless the water already contains the requisite $CO_2$ by origin. $CO_2$ and ozone are then simultaneously fed in for a period of several minutes. The feed stream of $CO_2$ is designed to maintain the pH value, and sufficient ozone is fed to the quantity of water to produce oxidation and sterilization.

13 Claims, No Drawings

PROCESS FOR TREATING BROMIDE-CONTAINING WATER USING OZONE

BACKGROUND OF THE INVENTION

The invention relates to a process for treating water using ozone.

If ozone is used during treatment of table water and mineral water, as well as drinking water, the problem arises that bromides contained in the water are partly oxidized by the ozone to bromate; bromates are regarded to be noxious. Though there are at present no limits for a content of bromate in water, it is known that bromates in a higher concentration may be carcinogenic.

The formation of bromate ions by ozonizing bromide-containing water is known. It is further known that the bromate formation under a constant concentration of ozone in water largely depends on the pH value of the water. See e.g., U. von Gunten and J. Hoigné, J. Water SRT-Aqua 41 (5): 299–304, 1992, Factors Controlling the Formation of Bromate Ion during Ozonation of Bromide-containing Waters. In this publication there is further on given the hint that ammonia may lead to formation of monobromamine which is subsequently further oxidized to nitrate and bromide ions. It is suggested to get rid of the bromate problem by adding ammonia. Addition of ammonia, however, influences the quality of the water and there are legal limits to be respected.

OBJECTIVES OF THE INVENTION

It is an object of the invention to modify the known process of water treatment with ozone in such a way and to further develop it that the formation of bromates is minimized, whereby the quality of the water is touched as little as possible.

This object is solved by a water treatment process using ozone whereby, to prevent bromate formation, a quantity of bromide-containing water to be treated is first set to a pH value of less than 6.5 by introducing $CO_2$, unless the water already contains the requisite $CO_2$, and ozone and $CO_2$ are simultaneously introduced for a period of several minutes, whereby the amount of $CO_2$ introduced is chosen in such a way that the pH value is maintained and sufficient ozone is introduced into the quantity of water to produce oxidation, sterilization and degermination.

It came out unexpectedly that by lowering the pH value to or below 6.5, it is possible to avoid the oxidation of bromide to bromate by ozone; in any case to at least minimize the formation of bromate. In experiments made according to the teaching of the invention, it was found that under the given conditions the content of bromide prior to and after the oxidation using ozone is almost identical. This proves that under the conditions of the invention there is practically no formation of bromates from bromides.

According to the invention, no additional chemicals, as for example ammonia, are added to the water to cover the bromate problem, but gaseous additions known per se are used—namely ozone and carbon dioxide—whereby the introduction of these additions and their influence on the water is well known and studied to a great extent. By a positive procedure-oriented handling, it is possible to minimize the bromate problem to a great extent. It is a special advantage that the pH values are not set by rather strong acids, e.g., hydrochloric acid or sulfuric acid, which principally may be added according to the regulations about drinking water, but only by introducing carbon dioxide.

The process according to the invention may be used for treating mineral and table waters, as well as drinking water. In spite of the modified pH value, an oxidation of iron and manganese is carried out successfully in mineral and table waters. By this, the known dimmings and opacities resulting from iron and manganese compounds, e.g., iron-(III)-oxide-hydrate-induced unclarities, no longer appear. The same problems are important in principal for drinking water, too. The cited compounds are not dangerous to health; iron compounds are essential for a large amount of organisms.

According to the invention, a water treatment—namely a water conditioning with ozone—is possible with all those steps and procedures and with the very result as previously known, but in addition the simultaneous introduction of $CO_2$ almost completely suppresses the bromate formation. By this, the ozonation of drinking and fountain water is no longer to be classified as a problematic process and does not lead to a formation of noxious bromates in the water treated. This equally holds for conditioned drinking water originating from bromide-containing untreated water.

A certain amount of bromate may be formed in spite of the treatment according to the invention. This amount is below the detection limit and is probably not dangerous to health. For a further reduction of the formation of bromates, it is as well possible to reduce the pH value of the amount of water treated by introducing more $CO_2$ as it is possible to remove the bromate formed by filtration in appropriate downstream procedures. Hereby activated carbons, especially grained or powdered activated carbons, and grained and fused alumina oxides with a grain structure of 0.05 to 5 mm, preferably 0.1 to 0.5 mm, have shown advantages. Thereby it is possible to remove formed bromate by filtration with a suitable activated carbon, whereby the bromates are adsorbed onto the surfaces of the activated carbon. However, a filtration with activated carbon has the disadvantage that the ozone is removed, too—it is reduced to oxygen.

In this respect, a filtration with alumina oxide has shown to be favorable. This filtration retains formed bromate as well by adsorbing it onto the surfaces, but the ozone is mainly kept in the water. Further on by activated carbon and alumina-oxide filters, the so-called organic precursors are adsorptively retained, which are formed during the ozone treatment, i.e., partially oxidized humic matters. Precursors like that would be troublesome when chlorinating later on.

Due to the simultaneous introduction of $CO_2$ and $O_3$ during the treatment of water, the decrease in $CO_2$ during introduction of ozone-enriched water is balanced. Thereby the pH value of the amount of water treated is kept generally constant. If there were no introduction of $CO_2$, the pH value during ozonation would slowly rise due to the stripping of $CO_2$ out of the amount of water treated; this would reinstate the formation of bromate. It is decisive for the procedure of the invention that $C_2$, too, is always introduced with the introduction of $O_3$ to keep the pH value below the given threshold value of 6.5, preferably even below a threshold of 6.

Use of alumina-oxide filters offers the advantage that fluorides, arsenates, arsenites and phosphates are removed out of the water by adsorption. This result of filtration with alumina-oxide filters is known.

It is an advantage of the inventive process that, in addition to a suppression of the formation of bromates out of bromides dissolved in the water, the formation of iodate out of dissolved iodide in the water is suppressed in the same way.

Iodide is an essential trace element and is vital for the human and animal body. Iodate in contrast to bromate is less toxic and thus less dangerous. The inventive process allows to have practically no formation of iodate (detection limit of 0.025 mg/L), but iodide is maintained, which has the mentioned positive influence.

Decisive for performing the inventive process is a selection of the filter operating on an adsorption effect. Whereas some activated carbons rather effectively retain formed bromate, this is not the case for other activated carbons. Powdered activated carbons have shown to be very efficient. Positive results have been obtained with grainy activated carbons, especially with activated carbons having a mean grain diameter in the vicinity of 1 mm, e.g., 1.0 mm or 1.6 mm mean grain diameter. It has shown to be an advantage that the total surface according to BET of the activated carbon is above 1000 $m_2/g$. Good results have been obtained with filters made of activated carbons produced from mineral coal. Even if iodate was formed in a small amount, it could be removed by filtration.

A filtration with activated carbon is basically not necessary if during ozonation the pH value of the amount of water treated remains below 6.5. A filtration to stay on the safe side, however, with activated carbon or alumina oxide is recommended.

Principally the treatment can be performed with a batch of water or in a continuous procedure. When treating in a continuous process, an efficient duration of the retention time should be obeyed. There are no differences to usual oxidation of water, and so far the known ways of treatment may be used.

When treating drinking water, the treated water should not be set to an acidic level, i.e., a pH below 7. With mineral and table waters, pH values in the acidic range are common through and through, however. An acidic setting of drinking water could give rise to a corrosion of the tubing and further problems. To avoid that acidically set drinking water reaches the water distribution net when conditioning drinking water according to the inventive procedure, it is proposed to remove the introduced $CO_2$ after the ozonation out of the treated water. This may, e.g., be done by stripping out the $CO_2$ with purified air or with a usual deacidification procedure according to the state of the art.

EXAMPLE 1

Bi-distilled water was doped with mangane-II-chloride, iron-II-sulfate, potassium bromide and potassium iodide. A sample of the doped water was ozonized at a pH value above 7, a further sample at the pH value below 6, whereby for the setting the pH $CO_2$ was introduced into the sample simultaneously with the introduction of ozonized air. The volume current of the $O_3$-air mixture was about 0.2 $m^3/h$, in total about 15 mg ozone for feed through. Within five minutes of treatment about 0.2 mg/L solved ozone could be detected in the samples. During ozonation 0.002 $m^3$ $CO_2$ were additionally introduced into the sample treated with carbon dioxide during ozonation. Thereby, during ozonation the pH value of the water stayed below 6.5.

Prior to the oxidation by ozone, the bromide content of both samples was about 0.994 mg/L; and bromate was below the detection limit of 0.005 mg/L. In the first sample, where the oxidation with ozone was performed at a pH of 7, the bromide content after oxidation was 0.974 mg/L, and the bromate content was about 0.077 mg/L. In the other sample, which had been treated by oxidation with ozone at a pH value below 6.5, after oxidation the bromide content was about 1.082 mg/L, and bromate was below the detection limit.

This proves that an oxidation in an appropriate pH region allows to drastically diminish the formation of bromate.

In the first sample, the bromate formed could be lowered in a filtration step to a value of below the detection limit.

A pH value below 6.5 was set by introducing 0.007 $m^3$ $CO_2$ into the sample prior to the ozonation.

EXAMPLE 2

A natural mineral water having a $CO_2$ content from its origin was ozonized. Prior to ozonation, the mineral water showed a pH value of 6. As specified in Example 1, ozone was introduced but without an additional introduction of $CO_2$ during ozonation. During ozonation the pH value climbed to 6.5.

Prior to the oxidation, the bromide content was 0.31 mg/L, and the bromate content was below the detection limit of 0.005 mg/L. After oxidation, 0.30 mg/L bromide could be detected, and the bromate content was still below the detection limit.

To verify whether with this mineral water an oxidation of bromide to bromate happened at a pH value above 6.5 or not, the following experiment was performed with the same mineral water: A pH value of 7 was set by adding hydrated caustic soda. The bromide and bromate contents prior to oxidation were found to be the same as the aforementioned values. After oxidation at a pH of 7, 0.015 mg/L bromate could be detected, and the bromide content after oxidation was 0.30 mg/L. The bromate formed could be reduced by a filtration over a suitable activated carbon to values below the detection limit.

EXAMPLE 3

The experiment of Example 2 was performed with another mineral water (in the following called mineral water II) which due to its origin has a natural pH value of 6.5. Prior to oxidation, the bromide content was 0.15 mg/L, and bromate was below the detection limit of 0.005 mg/L. During the oxidation under the aforementioned conditions, the pH value increased from 6.5 to 8.0. This rise of the pH value can be explained by a stripping of solved carbon dioxide during the introduction of the ozone/air mixture; the mineral water II used had a natural content in solution of carbon dioxide of about 2 g/L $CO_2$.

After oxidation, the bromide content was 0.17 mg/L, and an amount of 0.016 mg/L bromate could be detected. The bromate content could be removed by filtration over an appropriate activated carbon to values below the detection limit.

The experiment with mineral water II was then repeated in such a way that during the oxidation continuously and at the same time carbon dioxide was introduced in a quantity so that the pH value remained below 6. Prior to oxidation, a bromide content of 0.16 could be detected, and bromate was below the detection limit. After oxidation at pH 6, there was a bromide content of 0.15 mg/L, and bromate was below the detection limit. This shows that natural mineral waters may be kept at a pH value below 6.5 by constantly introducing $CO_2$ during the oxidation; thereby the bromide formation due to ozone remains below the detection limit.

We claim:

1. Process for preventing the formation of bromate during the ozonation of bromide-containing water having a pH value not below 6.5; wherein:

$CO_2$ is introduced into said bromide-containing water until a pH value below 6.5 is attained; and then $CO_2$ and ozone are simultaneously introduced into the bromide-containing water for a period of several minutes, whereby the amount of $CO_2$ introduced is chosen such that a pH value below 6.5 is maintained and sufficient ozone is introduced into the quantity of water to produce oxidation, sterilization and degermination.

2. Process according to claim 1, including a step of filtration with activated carbon after the ozonation.

3. Process according to claim 1, including a step of filtration with alumina oxide after the ozonation, said alumina oxide being fused and present in granulated form, in a grain size area of 0.1 to 0.5 mm.

4. Process according to claim 1, wherein during ozonation the pH value is kept below 6.

5. Process according to claim 1, wherein the bromide-containing water being treated is mineral water having a pH value above 7.

6. Process of claim 1 wherein the bromide-containing water being treated is table water having a pH value above 7.

7. Process of claim 1 wherein the bromide-containing water being treated is mineral water having a pH value below 6.5 and showing an increase of the pH value during ozonation.

8. Process of claim 1 wherein the bromide-containing water being treated is table water having a pH value below 6.5 and showing an increase of the pH value during ozonation.

9. Process according to claim 1 for the treatment of drinking water containing bromide originating from shore line filtrate.

10. Process according to claim 8, wherein after ozonation the treated drinking water is set to a pH value in the neutral region.

11. Process according to claim 10, wherein said setting of a pH value is accomplished by a deacidification process.

12. Process according to claim 10, wherein said setting of a pH value is accomplished by stripping out the introduced $CO_2$ with cleaned air.

13. Process for preventing the formation of bromate during the ozonation of bromide-containing water by an amount of $CO_2$ by origin that is effective to maintain the pH value of the bromide-containing water below 6.5, wherein $CO_2$ and ozone are simultaneously fed into the bromide-containing water for a period of several minutes, wherein the amount of $CO_2$ introduced is such that a pH value below 6.5 is maintained and sufficient ozone is introduced into the quantity of bromide-containing water treated to produce oxidation, sterilization and degermination.

* * * * *